United States Patent
Benyovits

(12) 
(10) Patent No.: US 6,792,934 B2
(45) Date of Patent: Sep. 21, 2004

(54) V GROOVING MACHINE FOR NATURAL OR ENGINEERED STONE

(76) Inventor: Ted Benyovits, 30 Kings Cross Av., Richmond Hill, ON (CA), L4B 2Y1

(*) Notice: Subject to any disclaimer, the term of this patent is extended or adjusted under 35 U.S.C. 154(b) by 0 days.

(21) Appl. No.: 10/235,817

(22) Filed: Sep. 6, 2002

(65) Prior Publication Data

US 2003/0047176 A1 Mar. 13, 2003

Related U.S. Application Data

(60) Provisional application No. 60/318,617, filed on Sep. 13, 2001.

(51) Int. Cl.[7] ................................................ B28D 1/02
(52) U.S. Cl. ...................... 125/12; 125/13.01; 125/13.02
(58) Field of Search ............................... 125/12, 13.01, 125/13.02; 451/5–10; 83/72, 171

(56) References Cited

U.S. PATENT DOCUMENTS

| 1,648,938 A | | 11/1927 | Dietrich |
| 4,691,684 A | | 9/1987 | Negron-Crespo |
| 4,998,775 A | * | 3/1991 | Hollifield .................. 299/39.3 |
| 5,063,845 A | * | 11/1991 | Perretta ..................... 101/484 |
| 5,351,444 A | * | 10/1994 | Steere, Jr. .................... 451/69 |
| 5,413,521 A | * | 5/1995 | Terashima et al. ............. 451/1 |
| 6,358,115 B1 | * | 3/2002 | Koike et al. ................... 451/5 |

FOREIGN PATENT DOCUMENTS

| BE | 344 114 A | 8/1927 |
| DE | 42 06 274 A | 9/1992 |
| DE | 43 18 769 A | 12/1993 |
| EP | 0 985 490 A | 3/2000 |
| JP | 2001062802 A | 3/2001 |

* cited by examiner

*Primary Examiner*—Lee D. Wilson

(57) ABSTRACT

The present invention provides for an apparatus for forming a V groove in a sheet of natural, synthetic or engineered stone material. The apparatus comprises a table for supporting a work piece of natural, synthetic or engineered stone material to be cut, two or more cutting heads aligned to cut along the same line of the work piece of natural, synthetic or engineered stone material and a mechanism for moving the work piece or the cutting heads relative to one another to cut the V groove in the natural, synthetic or engineered stone work piece. Each of the cutting heads removes material from the natural, synthetic or engineered stone work piece with the final cutting head forming the shape of the desired V groove. Each of the cutting heads is provided with a means for air cooling the cutting surfaces.

5 Claims, 5 Drawing Sheets

V GROOVING MACHINE FOR NATURAL OR ENGINEERED STONE

This application claims the benefit of Provisional Application No. 60/318,617, filed Sep. 13, 2001.

FIELD OF THE INVENTION

The present invention relates to a V grooving machine capable of cutting a V groove in natural, synthetic or engineered stone at a high rate of speed.

BACKGROUND OF THE INVENTION

It is known to cut one or more V grooves in a sheet of wood or plastic solid surfacing material followed by folding and gluing the material at the V groove to form a joint. This fabrication method is commonly used in the manufacture of countertops as well as cabinets and other box like products. These V grooving processes have advantages including relatively low costs and production of strong joints. Recently, engineered stone products have been developed which mimic the feel and appearance of natural stone, such as marble, granite, onyx, etc. Such engineered products are becoming more prevalent for use as countertops in kitchens and other areas. These engineered stones however, are not as easily cut in V grooving machine of the prior art, as the cutting process is generally a wet process utilizing water as a cooling and lubricating medium and dust or waste removal. In addition, the rate of speed of the cutting operation is relatively slow in order to maintain a clean cut to allow the material to be glued at the V groove to form a joint. There thus remains a need for a simple and rapid method of forming V grooves in natural, synthetic or engineered stone material.

SUMMARY OF THE INVENTION

The present invention provides for an apparatus for forming a V groove in a sheet of natural, synthetic or engineered stone material. The apparatus comprises a table for supporting a work piece of natural, synthetic or engineered stone material to be cut, two or more cutting heads aligned to cut along the same line of the work piece of natural, synthetic or engineered stone material and a means of moving the work piece or the cutting heads relative to one another to cut the V groove in the natural, synthetic or engineered stone work piece. Each of the cutting heads removes material from the natural, synthetic or engineered stone work piece with the final cutting head forming the shape of the desired V groove. Each of the cutting heads is provided with a means for air cooling the cutting surfaces.

In an aspect of the invention, the apparatus is provided with two cutting heads, the first cutting head removing the majority of the material of the natural, synthetic or engineered stone work piece to form the V groove and the second cutting head forming the final V groove structure in the work piece of natural, synthetic or engineered material.

In another aspect of the invention the apparatus includes a belt drive to move the work piece past stationary cutting heads.

BRIEF DESCRIPTION OF THE DRAWINGS

Preferred embodiments of the present invention are illustrated in the attached drawings, wherein.

DETAILED DESCRIPTION OF THE PREFERRED EMBODIMENTS

Figure 1:
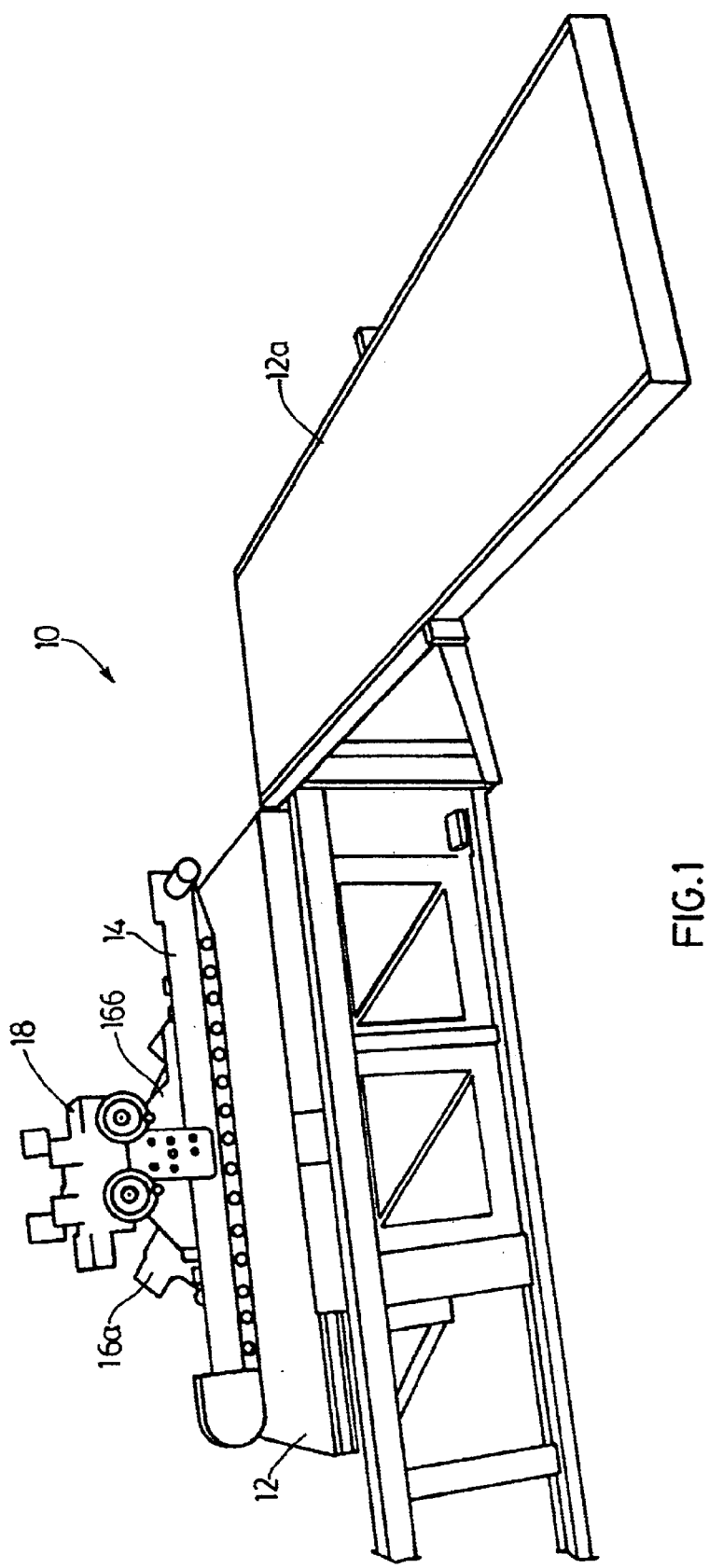
FIG. 1 is a perspective view of a preferred embodiment of a V grooving machine according to the present invention.
Figure 2:
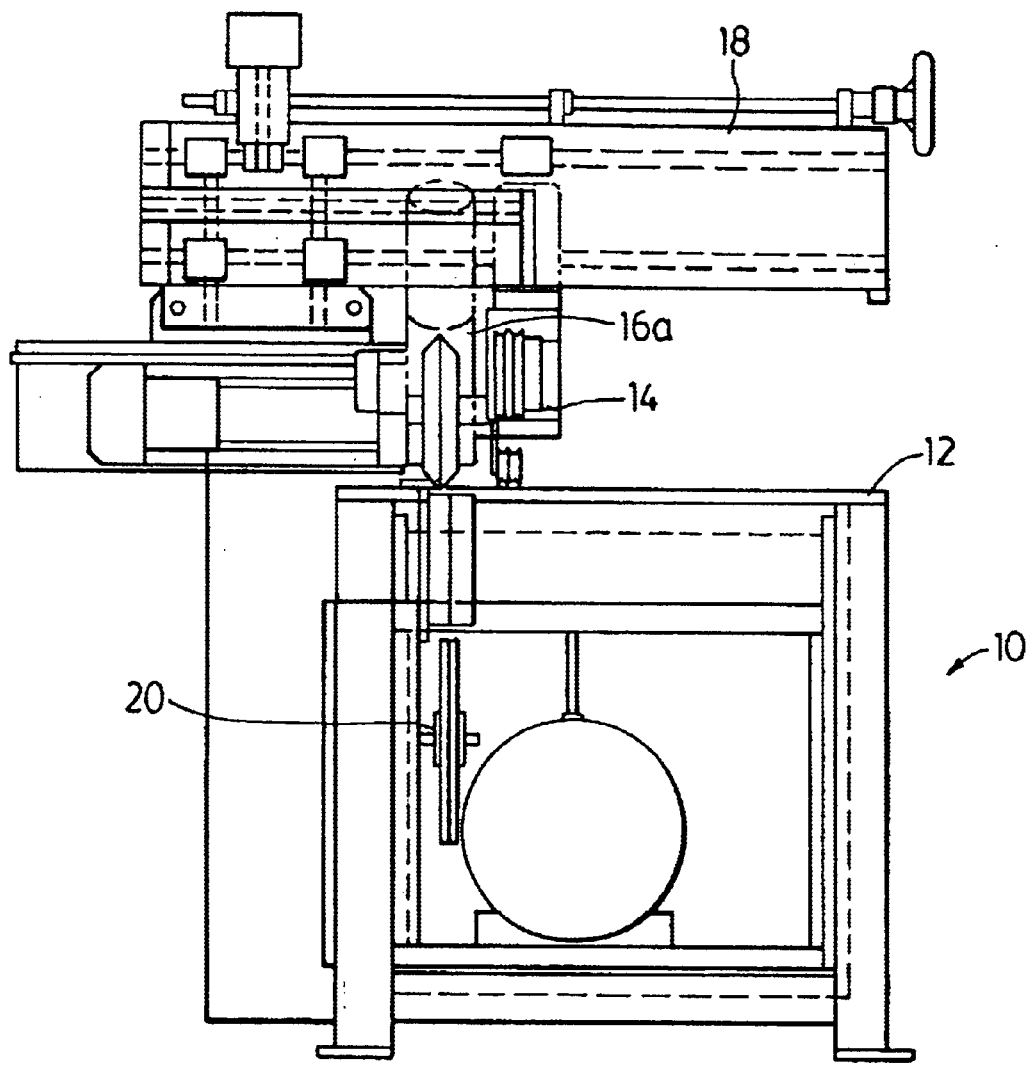
FIG. 2 is a side elevation view of the V grooving machine of FIG. 1.
Figure 3:
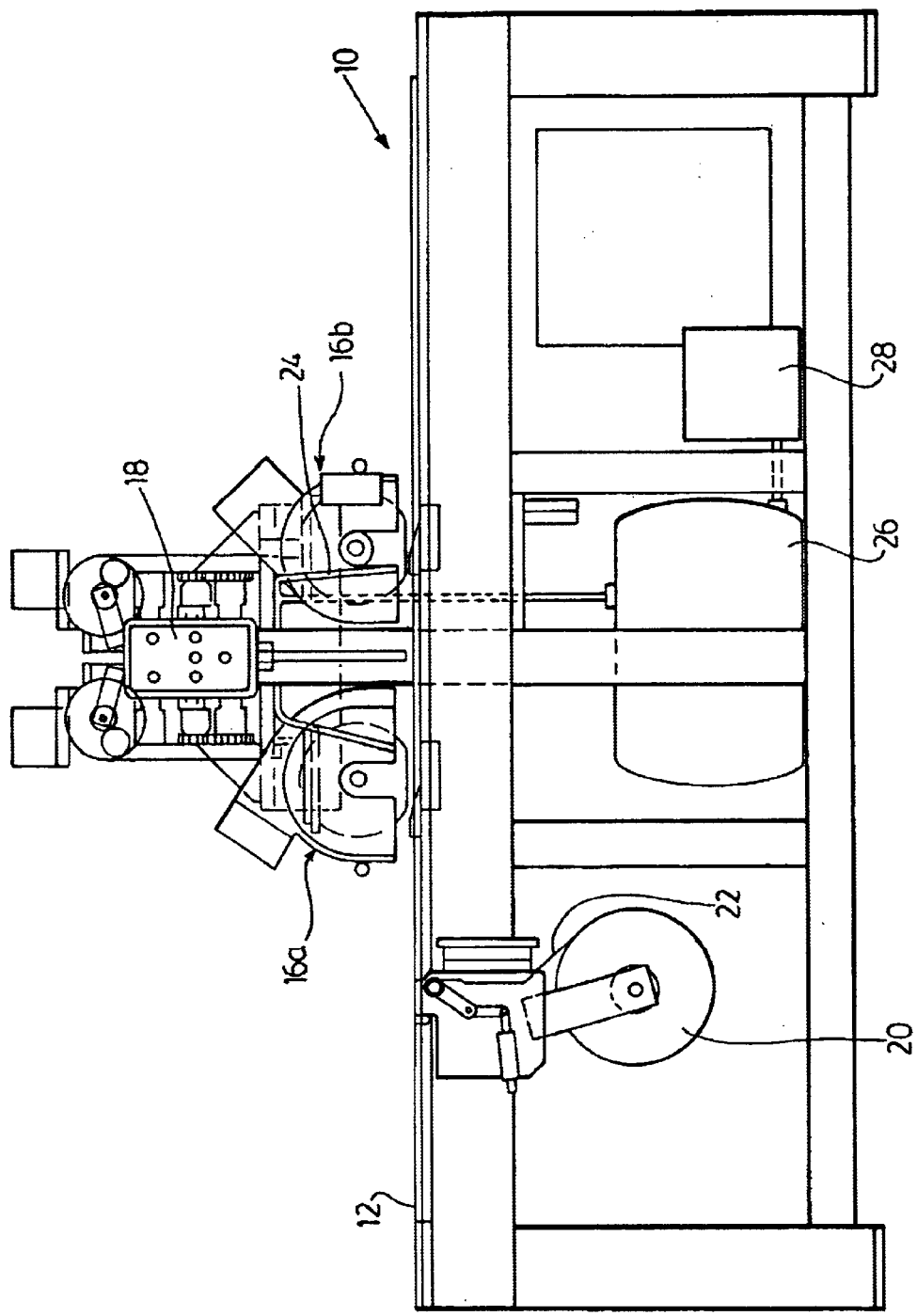
FIG. 3 is a front plan view of the V grooving machine of FIG. 1.

A preferred embodiment of a V grooving machine according to the present invention is illustrated in the attached figures. The V grooving machine 10 has a table 12 to support a work piece of a natural, synthetic or engineered stone material. V grooving machine 10 is also provided with a means for moving the material or cutting heads, 16a and 16b described below, relative to one another. In the preferred embodiment illustrated in the figures this means is a belt conveyor drive 14 which moves the material past stationary cutting heads 16a and 16b. While the embodiment illustrated utilizes a belt conveyor drive to move the material past the cutting heads, in an alternative arrangement, the material may be held in place and the cutting heads may be movable along the material.

V grooving machine 10 is provided with two or more cutting heads, each of the heads removing some of the material from the work piece until the final cutting head froms the desired V groove in the work piece. In the preferred embodiment illustrated, two cutting heads 16a and 16b for cutting the V groove in the natural, synthetic or engineered stone material in a single pass of the material past the cutting heads. Cutting heads 16a and 16b are mounted on a track system 18, which allows the cutting heads to be moved to the desired position across the width of the table 12. Cutting heads 16a and 16b are also adjustable in height relative to the table top to provide for proper cutting of the work piece. By providing cutting head height adjustment relative to the table top, the V groove formed in the work piece of the natural, synthetic or engineered stone material is of the proper dimension to allow the material to be folded over after the V groove is cut irrespective of the thickness of the material.

The V grooving machine 10 is also preferably provided with a tape dispenser 20, which dispenses tape 22 onto the underside of the work piece along the cut line. The use of the tape holds the pieces of the work piece together after they have been V grooved to allow for ease of clamping and gluing of the work piece.

Each of the cutting heads 16a and 16b are provided with air cooling which in the preferred embodiment is provided by two nozzles 24 for each cutting head 16a or 16b directing compressed air at the cutting surfaces to both cool the cutting head and to remove the cut material from the V groove. Preferably, in order to maintain a constant air pressure through the air nozzles 24, the V grooving apparatus 10 is provided with an airtank 26 between the compressor 28 providing the compressed air and the nozzles 24 at the cutting heads 16a or 16b.

Figure 4:
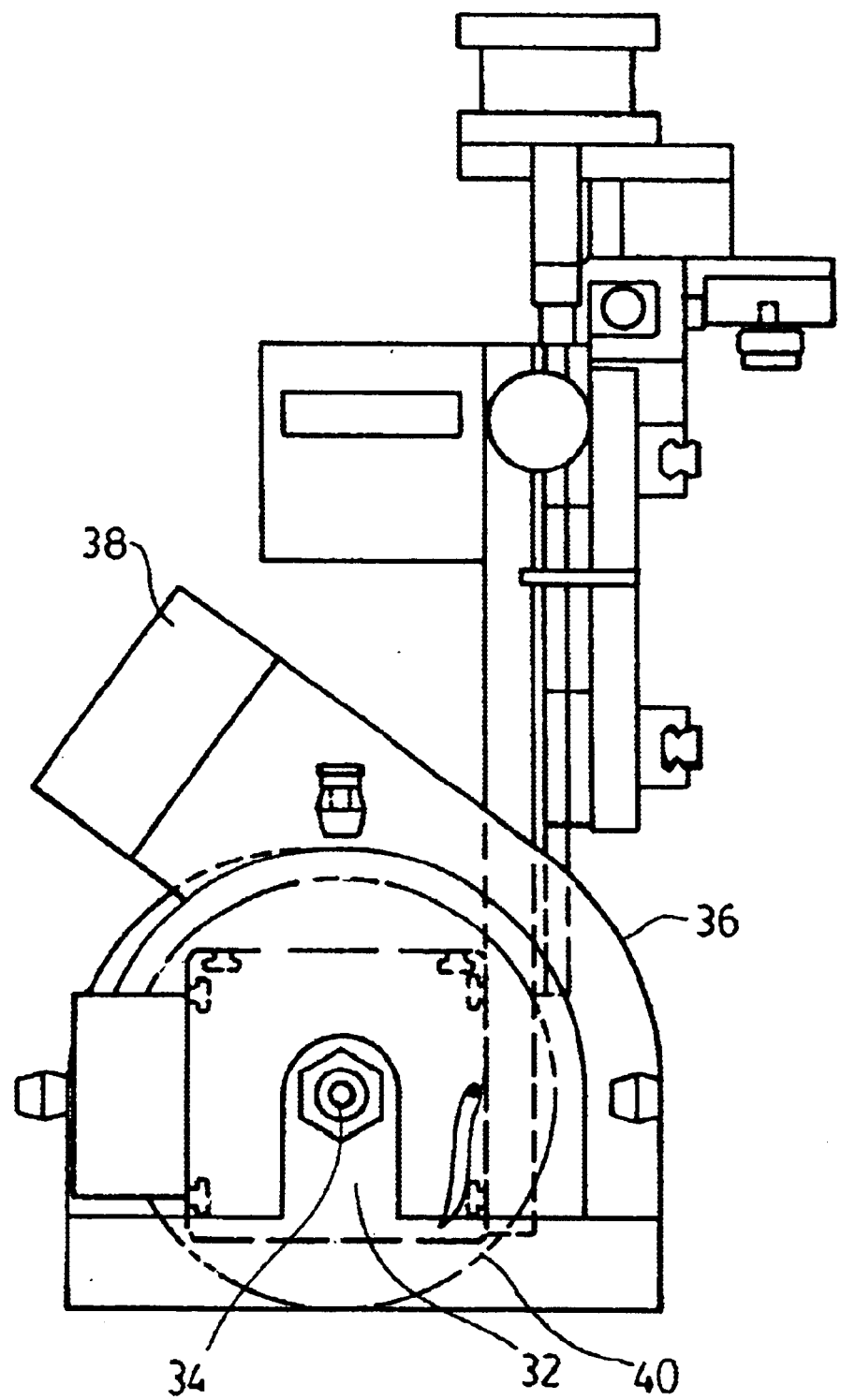
FIG. 4 is a front plan view of the cutting heads of the V grooving machine of FIG. 1.
Figure 5:
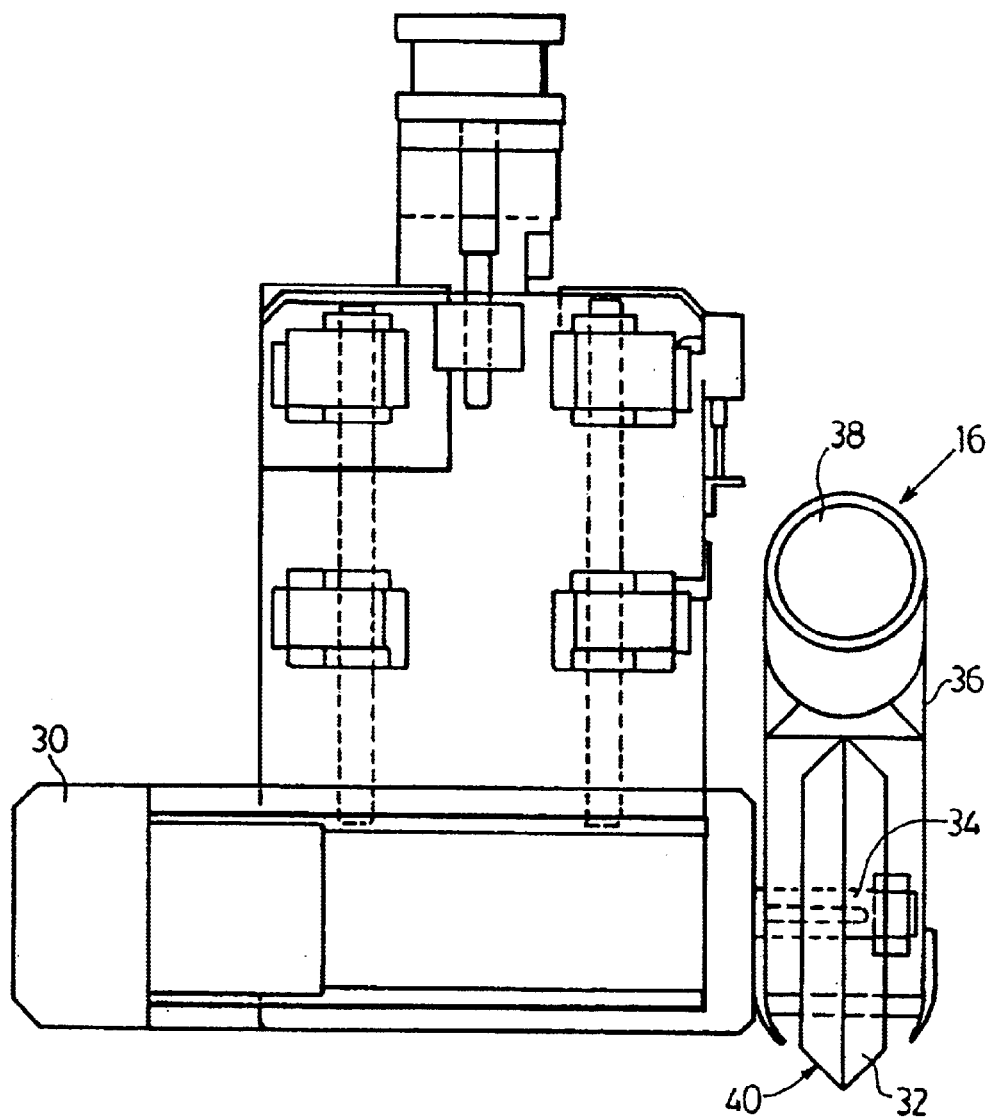
FIG. 5 is a side elevation view of the cutting heads of the V grooving machine of FIG. 1.

The cutting heads 16a and 16b are illustrated in detail in FIGS. 4 and 5. The cutting heads 16a and 16b have a motor drive 30 to drive the cutting wheel 32 at the optimum rotation for the removal of the material. The cutting wheel 32 is mounted on a spindle 34 connected to the motor drive 30. A shroud 36 is provided surrounding the cutting wheel 32 with a vacuum pick up 38 to aid in removal of the material cut from the surface of the natural, synthetic or engineered stone. To form a V V groove in the natural, synthetic or engineered stone material, the cutting wheel 32 has a V shaped cutting surface 40. Preferably, this cutting surface 40 is a diamond surface provided either as diamond dust or diamond chips bonded to a stainless steel base. The cutting surface 40 of the first cutting wheel 16a, is sized slightly smaller than the final desired V groove to be cut in the natural, synthetic or engineered or engineered stone material. The purpose of this cutting wheel 16a is to remove most of the material from the V groove of the natural, natural, synthetic or engineered stone material. Thus, the cutting surface 40 of the first cutting wheel 16a may be a relatively coarse grade of diamond chips or diamond dust on the surface of the cutting wheel 16a, although it may also be a fine grit. The second cutting wheel 16b is used to dimension the V groove of the natural, synthetic or engineered stone material to the final desired shape and dimension. This cutting wheel 16b is sized to accomplish this and in the preferred embodiment has a fine grit of diamond material on the cutting surface 40 of the wheel 16b.

In operation, the cutting heads 16a and 16b are positioned relative to the tabletop and the stop 42 to cut the desired V groove in the natural, synthetic or engineered stone material. For a countertop, where the purpose of the cut is to produce a finished front edge, the cutting heads 16a and 16b are spaced to cut a V groove at the desired dimension from the front edge. For most countertops this will be 1½ inches away from the stop, such that when the material is folded over, the front edge of the countertop is provided with a finished edge height of 1½ inches. However, other sizes of edges are easily accomadated.

The V grooving machine 10 is powered on by activating the motor drives 30 for the cutting heads 16a and 16b. The compressor 28 to provide the compressed air to the air nozzles 24 of the cutting heads 16a and 16b and the belt drive conveyor 14 to move the work piece are also activated. The work piece is then fed into the machine 10 by laying it at the end of the table top 12 and feeding it along. As the work piece passes the tape dispenser 20, a strip of tape 22 is attached to the underside of the work piece along the cut line to hold the two cut pieces together. The conveyor belt drive 14 moves the work piece along the table top surface 12 and past the cutting heads 16a and 16b. The first cutting wheel 32a forms the V groove or other desired shape in the work piece and the second cutting wheel 32b finishes the V groove giving it the final desired shape. Once the work piece has been cut, glue or other suitable bonding material is placed on the inside surfaces of the V groove, the pieces folded up to bring the two V grooved surfaces into contact with each other and the piece held by a suitable holding means such as clamps until the glue or other bonding material has set. Once the material has set, the tape is removed and final finishing of the work piece such as a countertop may be carried out.

It has surprisingly been found that utilizing the V grooving machine of the present invention, accurate V grooves may be cut in natural, synthetic or engineered stone material, such as natural, synthetic or engineered marble, granite, onyx, etc., at a relatively high rate of speed. By utilizing the two or more cutting heads of the V grooving machine of the present invention, it is possible to cut V grooves in such material at a rate of speed of four feet per minute or greater. Prior to the present invention, it was not possible to cut such stone material at such a high rate of speed.

Additionally, by providing air cooling of the apparatus according to the preferred embodiment of the present invention, clean up operations of work pieces, tools and the work place are simplified as there is no need to deal with cleaning and recycling of cutting fluid. Rather the provision of a bag collector for holding the dust and debris from the cutting operation is all that is required. An additional benefit of air cooling is that further processing is not necessary prior to gluing of the piece. When wet processing the material, the material will generally absorb some of the liquid and will require drying prior to gluing. In some situations, the drying may take several days and will require storage of the pieces.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An apparatus for forming a V groove in a sheet of natural, synthetic or engineered stone material, the apparatus comprising a table for supporting a work piece of natural, synthetic or engineered stone material to be cut, two or more cutting heads aligned to cut along a same line of the work piece of natural, synthetic or engineered stone material and a means of moving the work piece or the cutting heads relative to one another to cut the V groove in the natural, synthetic or engineered stone work piece, each of the cutting heads removing material from the natural, synthetic or engineered stone work piece with the final cutting head forming the shape of the desired V groove, each of the cutting heads being provided with a means for air cooling the cutting surfaces.

2. The apparatus for forming a V groove in a sheet of natural, synthetic or engineered stone material according to claim 1 wherein the apparatus is provided with two cutting heads, the first cutting head removing the majority of the material of the natural, synthetic or engineered stone work piece to form the V groove and the second cutting head forming the final V groove structure in the work piece of natural, synthetic or engineered material.

3. The apparatus for forming a V groove in a sheet of natural, synthetic or engineered stone material according to claim 1 wherein the apparatus includes a belt drive to move the work piece past stationary cutting heads.

4. The apparatus for forming a V groove in a sheet of natural, synthetic or engineered stone material according to claim 3 wherein the apparatus is provided with a tape dispenser for dispensing tape onto an underside of the work piece along the V groove cut.

5. The apparatus for forming a V groove in a sheet of natural, synthetic or engineered stone material according to claim 4 wherein the means for air cooling the cutting surface includes a source of compressed air and two air nozzles for each cutting head for directing the compressed air at the cutting surfaces of the cutting heads.

* * * * *